Patented Aug. 19, 1947

2,426,076

UNITED STATES PATENT OFFICE 2,426,076

PROCESS FOR TREATMENT OF VEGETABLE MATTER AND PRODUCT OBTAINED

Alexander M. Zenzes, New York, N. Y.

No Drawing. Application August 6, 1943,
Serial No. 497,693

5 Claims. (Cl. 99—141)

The invention relates to a process for treatment of vegetable matter and to products arising therefrom.

More particularly, it pertains to a treatment of sugar-beet substance, and includes correlated improvements and discoveries whereby the edible character of such substance is enhanced.

An object of the invention is to provide a process for treatment of a pulpy vegetable substance in a dried shredded form, which leads to products of markedly improved edibility.

A further object of the invention is to provide a procedure for treatment of sugar-beet substance, which expression as used herein in the specification and claims, means the sugar-beet as grown, with or without removal of the outer portions, and the sugar-beet pulp or residue resulting from a greater or lesser removal of sugar-laden juice, i. e., following a de-sugaring, which yields a product of greater edibility, well adapted for human consumption and, if desired, simulating natural cocoanut.

A still further object of the invention is the provision of a procedure whereby natural color of vegetable matter, as a dried sugar-beet substance, may be removed to a desired extent.

Other objects of the invention are the provision of a process for impregnation of dried shredded vegetable substances with a flavor; for whitening of dried pulpy vegetable substances by deposition on the surface thereof, thus forming a film or coating of minute crystals of a sugar, as sucrose, and especially to provide products having a base of dried pulpy vegetable substance, particularly sugar-beet pulp, which carry a synthetic and/or extraneous flavor, food or coloring substance, and which simulate various fruits and vegetables as, for example, the cocoanut. Moreover, these products may be in shredded, flaked or ground form.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the invention will be indicated in the claims.

In the practice of the invention a treatment of vegetable matter may be effected by preparing a solution of a sugar, such as sucrose, which may be partially inverted, dextrose and the like, by dissolving such sugar in water to give a solution having a density from about 60° to 90° Brix, preferably about 80°, then adding dried edible pulpy vegetable substance, as sugar-beet substance, in form of shreds thereto and admixing, as by suitable agitation until the solution has been wholly taken up by the dried vegetable substance, whereby a whitening of the vegetable substance is effected through the crystallization or formation of minute crystals upon the surface of the vegetable matter. Thus, a solution of sucrose in water having a concentration of about 80° Brix may be prepared and, following the introduction thereinto of a salt or salts, e. g., representative of the ash of sugar-beet and particularly those salts which are normally present in the fresh sugar-beet and preferably in the same state in which they are present in the fresh beet, and a flavor, as vanillin or synthetic or natural cocoanut flavor, dried shredded sugar-beet pulp, i. e., the residue remaining after extraction of the sugar, i. e., de-sugaring of the beet substance, is incorporated therewith under agitation until the solution has been taken up and sugar crystals of very small size formed upon the surface. Thus, a vegetable product may be produced having a cocoanut flavor and also the structure, appearance and chewing qualities of natural cocoanut meat.

The introduction of soluble salts which are removed during the de-sugaring of the sugar-beet tends to enhance the edible qualities. It has been found desirable to utilize the interior portion of the sugar-beet rather than the whole beet inasmuch as thereby a whiter product, which may be obtained by leaching and/or bleaching, results. Where an improvement in color is desired, such may be effected by immersing the material, either before or after drying and suitably before, in a medium containing a member of the group consisting of sodium silicate, acetate, carbonate and hydroxide, and preferably also with the inclusion of hydrogen peroxide. It will be appreciated that these compounds may be used singly or in conjunction, and following immersion the mass may be acidified. White fibrous products are thus produced, and they may be utilized in food compositions, either as such or following various treatments, such as those hereinafter described. They have been found to be well adapted for use in the manufacture of confectionery and baked products. Furthermore, the vegetable matter, during the course of treatment, may be contacted with an added fatty material, for example, a hydrogenated fat or oil.

As illustrative of a manner in which the invention may be practiced for the production of a whitened material, the following example is presented. The ingredients may be:

Sugar (sucrose) _____ pounds__ 100
Dried shredded sugar-beet substance_do____ 150
Flavor _____ ounces__ 14
A salt or salts_____ do____ 1.5
Vanillin _____ do____ 1
Water The sugar is dissolved in a quantity of water sufficient to give a ready solution, and then concentrated to about 80° Brix. Desirably, the solution is permitted to cool to about 220° F., whereupon the flavors and the salt or salts, e. g., calcium and potassium phosphates and sulphates, and magnesium chloride are added in the form of a solution, and the shredded beet substance is then incorporated while the mass is fully admixed by rapid agitation. The shredded beet substance acts as a base, or nucleus, which absorbs the sugar solution, and upon the surface of it sugar crystals form a film or coating, in which the crystals are of very small size. As indicated, the solution is wholly taken up or absorbed by the beet substance so that after short agitation, which may vary from a few seconds to a few minutes, there is obtained a mass of dry, separate, free-flowing white shreds.

While such procedure is well adapted for the treatment of dried shredded sugar-beet substance because of the moisture absorptive capacity thereof, nevertheless it may be applied equally well for the treatment of natural cocoanut whereby it is sweetened and at the same time the yellow color, which is sometimes displayed, is obviated by a film or coating of fine sugar crystals, thus giving a whitening effect. When natural cocoanut is so treated it is desirable, as a preparatory step, to dehydrate, whereby the capacity to absorb moisture is distinctly increased. Such procedure is the opposite of that usually followed in preparation of natural cocoanut since that requires a drying step subsequent to the addition of sugar.

Sugar-beet or similar vegetable substance may be given a cocoanut flavor, and have the appearance of natural cocoanut by combining fresh cocoanut, or a concentrated cocoanut milk, with the vegetable substance in suitable proportions and under relatively high pressure. This brings about a transfer and redistribution of the cocoanut flavor components to the vegetable substance. If the proportion of fresh cocoanut—other fresh fruit or vegetable might also be utilized—with respect to the dried vegetable substance, as sugar-beet in form of shreds, is properly chosen the mass resulting from compression will retain moisture even under pressure, which may be as high as 28,000 lbs. per square inch. The mass contains a uniform distribution of the fresh fruit material, is stable, and may be readily disintegrated or broken apart by the user in the preparation of baked products and confections. If desired, the employment of a fresh fruit may be accompanied by the addition of a small amount of synthetic flavor whereby the natural flavor is augmented and the neutral taste of the vegetable matter overcome.

Preparation of products from fresh fruits may be brought about in accordance with the following description. Utilization may be made of 100 lbs. fresh shredded cocoanut meat; 200 lbs. dried shredded sugar-beet residue, preferably decolorized; 2 ozs. salt; and 4 ozs. synthetic cocoanut flavor. The salt and synthetic flavor may be evenly distributed through the sugar-beet material by spraying thereupon, and subsequently the fresh cocoanut meat is combined with the flavored sugar-beet material and the resultant mixture subjected to a pressure of not less than 15,000 lbs. per square inch. A compact mass is thus obtained, which may be employed in that form or may be disintegrated, as desired.

Another procedure may use 100 lbs. fresh pitted prunes; 200 lbs. dried shredded sugar-beet residue; 100 lbs. sugar, preferably of low purity; and 6 ozs. synthetic prune flavor, and an acid, which may be tartaric, citric, malic, and the like. These ingredients may be combined in the manner just above described. However, if sugar is to be included, then the method for introducing the sugar into the sugar-beet substance, with the formation of small crystals upon the surface, may be followed.

Additionally, the combination of sugar and synthetic fruit flavor may be combined with the fresh fruit in the form of a syrup of high density and the mass obtained compressed, as above indicated. The fresh fruit product so produced, which may be from cocoanut, prunes, apricots and other fresh fruits, as well as various vegetables, may be utilized readily, as in the manufacture of pies, and possesses the characteristics of the fresh fruit without the usual subjection to a high temperature or prolonged sterilization. The products obtained are wholesome and beneficial, and economical to use. Further, they retain their fresh character for a considerable period of time, and although the compressed form presents a hard glass-like surface, nevertheless it may be readily broken apart.

Inasmuch as the natural sugar-beet substance, either prior to or following de-sugaring, is of a grayish color and does not, e. g., resemble the meat of desiccated cocoanut, it is desirable to remove this color, and such removal can be brought about substantially instantaneously by immersing moist or dry sugar-beet shreds in an alkaline aqueous solution having a pH value of at least, i. e., upwards of 8.0, as one having a concentration of 1 to 5% containing sodium silicate, carbonate, acetate or hydroxide, preferably in the presence of hydrogen peroxide, or a mixture thereof.

While the treatment may be carried out at room temperature, about 70° F., a somewhat higher temperature is preferred. Thus, a medium may be prepared with 100 liters of hydrogen peroxide, 3%; 500 liters water; and 6 liters of sodium silicate solution having the composition of approximately 40° Baumé. This solution may suitably be heated to about 175° F., and the vegetable substance, as shredded sugar-beet substance, after soaking in water, is immersed therein. The grayish color disappears almost instantly, with a change to a chlorophyl hue.

It has been found that the result follows also from the use of sodium silicate and other sodium salts alone, but it is not as satisfactory. The material is then removed from the bath and pressed with the liquid being returned for the treatment of another portion. The solid mass, after pressing, may be leached and dried and subsequently flavored and whitened in accordance with the procedures above described. A substantially water-white product which simulates the color and structure of cocoanut may be prepared by treating that which has the chlorophyl-like color in a weakly acid bath, as of hydrochloric acid in order to neutralize alkali present with formation of sodium chloride which is harmless and often desirable. Following withdrawal from the bath the mass may be washed, if desired to remove any unreacted acid and a greater or lesser quantity of the sodium chloride.

Further, the material so obtained may be treated to impart thereto the whitening effect of the small sugar crystals and an incorporating cocoanut flavor so that the final product has the taste, structure and appearance of natural shredded cocoanut. If desired, the cocoanut flavored product may be colored through the utilization of an edible oil-soluble color which has been introduced into an edible oil, and such oil then incorporated with sugar-beet substance. The oil employed suitably is a hydrogenated oil. Furthermore, the sugar-beet residue in the form of shreds may be flaked, expanded or tinted. If it is desired to render the sugar-beet substance somewhat more digestible, this may be occasioned by subjecting it to the action of an acid, preferably a 5% solution of hydrochloric acid for 20 to 30 minutes at a temperature of 250–300° F. The acid subsequently may be removed by washing or it may be neutralized with a sodium alkali whereby ordinary table salt is formed. Moreover, the absorptive capacity of the dried shredded sugar-beet substance may be increased by heating. Thereby the rate of formation of sugar crystals upon the surface is accelerated and there results a film or coating of very small particles having marked whiteness.

I have found that for this purpose it is preferable to segregate the outer portions of the beet from the inner portions which lend themselves more readily to instantaneous decolorization and hence the procedure, in outline, may be peeling sugar-beets, segregating the peels from the peeled portion, treating the latter for the extraction of sugar, decolorizing by the above described methods, then coloring and flavoring the fiber by passage through suitable colored flavoring solutions, and subsequently drying. Thereby a wholesome vegetable product is obtained which is available for human consumption and which is economical. Moreover, the beet pulp may, preferably preceding flavoring, be precooked suitably under increased pressure or other treatment, such as puffing, exploding and the like.

The invention accordingly leads to the production of a product from partly or wholly de-sugared sugar-beet which, through combination with sugar and flavors, simulates natural cocoanut or other fruit or vegetable. This is attained by accomplishing a deposition of minute sugar crystals on the sugar-beet substance from a super-saturated sugar solution, with effectuation of a whitening thereof. It is desired to mention that although sugar-beet substance has been found to be an economical and wholesome material to be impregnated with sugar and various fruit and vegetable flavors, nevertheless other dried pulpy vegetable substance, as that from citrus fruits, for example, lemon, orange and grapefruit, may be used, and also the fibrous residue from the extraction of sugar from sugar cane; known as "bagasse." However, when such are employed it may be desirable to process them for the removal of elements giving a bitter taste.

The procedure of the invention leads, among others, to the following results: production of dried shredded sugar-beet substance; economical use of sugar-beet substance, particularly that which has been wholly or partly de-sugared; decolorization of vegetable material, especially sugar-beet; impregnation of edible vegetable substance with synthetic or extraneous food, flavor and coloring matters; utilization of sugar-beet residue through its availability for human consumption with added flavors, fats, and other food materials, whitening of vegetable material through deposition thereon of a film or coating of ultra-fine sugar crystals; and transfer of fresh fruit and vegetable substances, as carrots and cocoanut, directly from the fresh fruit or vegetable onto pulpy vegetable substance through admixture and subjection to high pressure whereby flavor, fats and other liquid and dissolved substances of the fresh products are transferred.

Since certain changes in carrying out the above process, and certain modifications in the composition which embody the invention may be made without departing from its scope, it is intended that all matter contained in the above description shall be interpreted as illustrative and not in a limiting sense.

Having described my invention, what I claim as new and desire to secure by Letters Patent is:

1. An edible sugar beet product comprising a free-flowing mass of dried, cut-up sugar beet pieces with each piece being substantially colorless internally while bearing externally thereof minute sugar crystals of a size corresponding to the condition of spontaneous crystallization in situ from a supersaturated sugar solution.

2. A process for making an edible product from sugar beets which comprises cutting up beet pulp into pieces, inhibiting discoloration thereof whereby they remain substantially colorless, drying such pieces to increase significantly their moisture absorptive capacity, mixing such pieces with a supersaturated solution of sugar having a predetermined Brix, and agitating the mixture until the solution is substantially wholly absorbed by the pieces during which minute sugar crystals are formed spontaneously in situ on the surface of the pieces thus yielding a mass of dry, separate, free-flowing pieces that are white externally and substantially colorless internally.

3. The process according to claim 2, wherein the Brix of the solution used lies in a range of from substantially 60° to substantially 90°.

4. An edible sugar beet product comprising a highly compressed, substantially dry mass of discoloration-inhibited, dried, cut-up sugar beet pieces impregnated with fruit juice substantially free of normal sugar beet characteristics of color and taste.

5. A process for making an edible product from sugar beets which comprises cutting up beet pulp into pieces, inhibiting discoloration thereof whereby they remain substantially colorless, drying such pieces to increase significantly their moisture absorptive capacity, distributing fruit juice throughout the pieces, and compressing the mixture with pressures in a range of from substantially 1000 to 2000 atmospheres for yielding a dried sugar beet product impregnated with fruit juice which has substantially lost its normal beet taste and color.

ALEXANDER M. ZENZES.

REFERENCES CITED

The following references are of record in the file of this patent:

UNITED STATES PATENTS

| Number | Name | Date |
|---|---|---|
| 391,530 | Hennemeier | Oct. 23, 1888 |
| 262,497 | Stow et al. | Aug. 8, 1882 |
| 1,612,087 | Zucker | Dec. 28, 1926 |
| 2,272,989 | Forkner et al. | Feb. 10, 1942 |
| 1,841,432 | Clarke | Jan. 19, 1932 |
| 2,243,381 | Klopfer | May 27, 1941 |
| 1,230,366 | Baker, Jr. | June 19, 1917 |
| 1,598,883 | Sackett | Sept. 7, 1926 |
| 924,411 | Abramowski et al. | June 8, 1909 |
| 207,271 | Frezon et al. | Aug. 20, 1878 |
| 1,686,786 | Zeller | Oct. 9, 1928 |
| 1,886,233 | Sanders | Nov. 1, 1932 |